US010168107B2

(12) United States Patent
Danov et al.

(10) Patent No.: US 10,168,107 B2
(45) Date of Patent: Jan. 1, 2019

(54) HEAT STORE CONTAINER WITH INCLINED PLATES FOR IMPROVED TEMPERATURE DISTRIBUTION

(71) Applicant: Siemens Aktiengesellschaft, Munich (DE)

(72) Inventors: Vladimir Danov, Erlangen (DE); Theodoros Papadopoulos, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/124,224

(22) PCT Filed: Apr. 22, 2015

(86) PCT No.: PCT/EP2015/058732
§ 371 (c)(1),
(2) Date: Sep. 7, 2016

(87) PCT Pub. No.: WO2015/169601
PCT Pub. Date: Nov. 12, 2015

(65) Prior Publication Data
US 2017/0045302 A1    Feb. 16, 2017

(30) Foreign Application Priority Data
May 6, 2014    (DE) .................. 10 2014 208 453

(51) Int. Cl.
*F28D 17/00*    (2006.01)
*F24J 3/08*    (2006.01)
(Continued)

(52) U.S. Cl.
CPC ........ *F28D 20/0056* (2013.01); *F28F 13/003* (2013.01); *F28F 21/04* (2013.01);
(Continued)

(58) Field of Classification Search
CPC ............ F28D 20/0043; F28D 20/0056; F28D 2020/0069; F28D 17/04; F28F 1/34; F28F 2009/228
(Continued)

(56) References Cited

U.S. PATENT DOCUMENTS

| 1,848,242 | A | * | 3/1932 | Claassen | ................. F28F 21/04 165/9.2 |
| 3,191,630 | A | * | 6/1965 | Demyan | .............. G05D 7/0186 138/42 |
| 4,010,731 | A | * | 3/1977 | Harrison | .................... F24J 3/06 126/400 |

(Continued)

FOREIGN PATENT DOCUMENTS

| CN | 101004308 A | 7/2007 | ............... C09K 5/06 |
| CN | 201149453 Y | 11/2008 | ................. F24J 2/04 |

(Continued)

OTHER PUBLICATIONS

Translation of Japanese Patent Document JP 59153044 A entitled Translation—JP 59153044 A.*
(Continued)

*Primary Examiner* — Len Tran
*Assistant Examiner* — Paul Alvare
(74) *Attorney, Agent, or Firm* — Slayden Grubert Beard PLLC

(57) ABSTRACT

A heat accumulator for storing thermal energy may include a container having a horizontally extending longitudinal axis, and a thermal storage material. The container may have a first opening for inflow and/or outflow of a fluid, a second opening offset vertically opposite the first opening, and at least one fluid-impermeable plate which is inclined against an inflow and/or an outflow direction of the fluid.

8 Claims, 1 Drawing Sheet

(51) Int. Cl.
*F28D 20/00* (2006.01)
*F28F 13/00* (2006.01)
*F28F 21/04* (2006.01)
*F28D 17/04* (2006.01)
*F28F 9/22* (2006.01)

(52) U.S. Cl.
CPC .......... *F28D 17/04* (2013.01); *F28D 20/0043* (2013.01); *F28D 2020/0069* (2013.01); *F28F 2009/228* (2013.01); *Y02E 60/142* (2013.01)

(58) Field of Classification Search
USPC .................................................... 165/10, 45
See application file for complete search history.

(56) References Cited

U.S. PATENT DOCUMENTS

| | | | |
|---|---|---|---|
| 4,150,547 A | * | 4/1979 | Hobson ............... F02C 6/16 165/45 |
| 4,286,141 A | * | 8/1981 | MacCracken ....... F24H 7/0416 165/10 |
| 9,410,748 B2 | | 8/2016 | Schneider et al. |

FOREIGN PATENT DOCUMENTS

| | | | | |
|---|---|---|---|---|
| CN | 102679784 A | | 9/2012 | ............... F01N 5/02 |
| GB | 2227304 A | | 7/1990 | ............. F28D 17/00 |
| JP | 57202492 A | | 12/1982 | ............. F28D 20/00 |
| JP | 591995 A | | 1/1984 | ............. F28D 17/00 |
| JP | 59153044 A | * | 8/1984 | |
| JP | 6294794 A | | 5/1987 | ............. F28D 20/00 |
| JP | 2004069123 A | | 3/2004 | ................ G10G 3/04 |
| JP | 2012136940 A | | 7/2012 | ............. B65D 25/04 |
| WO | 2012/017041 A2 | | 2/2012 | ............. F28D 17/00 |
| WO | 2015/169601 A1 | | 11/2015 | ............. F28D 20/00 |

OTHER PUBLICATIONS

German Search Report, Application No. 102014208453.9, 7 pages, dated Mar. 24, 2015.
International Search Report and Written Opinion, Application No. PCT/EP2015/058732, 10 pages, dated Aug. 5, 2015.
Chinese Office Action, Application No. 201580019421.1, 6 pages, dated Jan. 2, 2018.

* cited by examiner

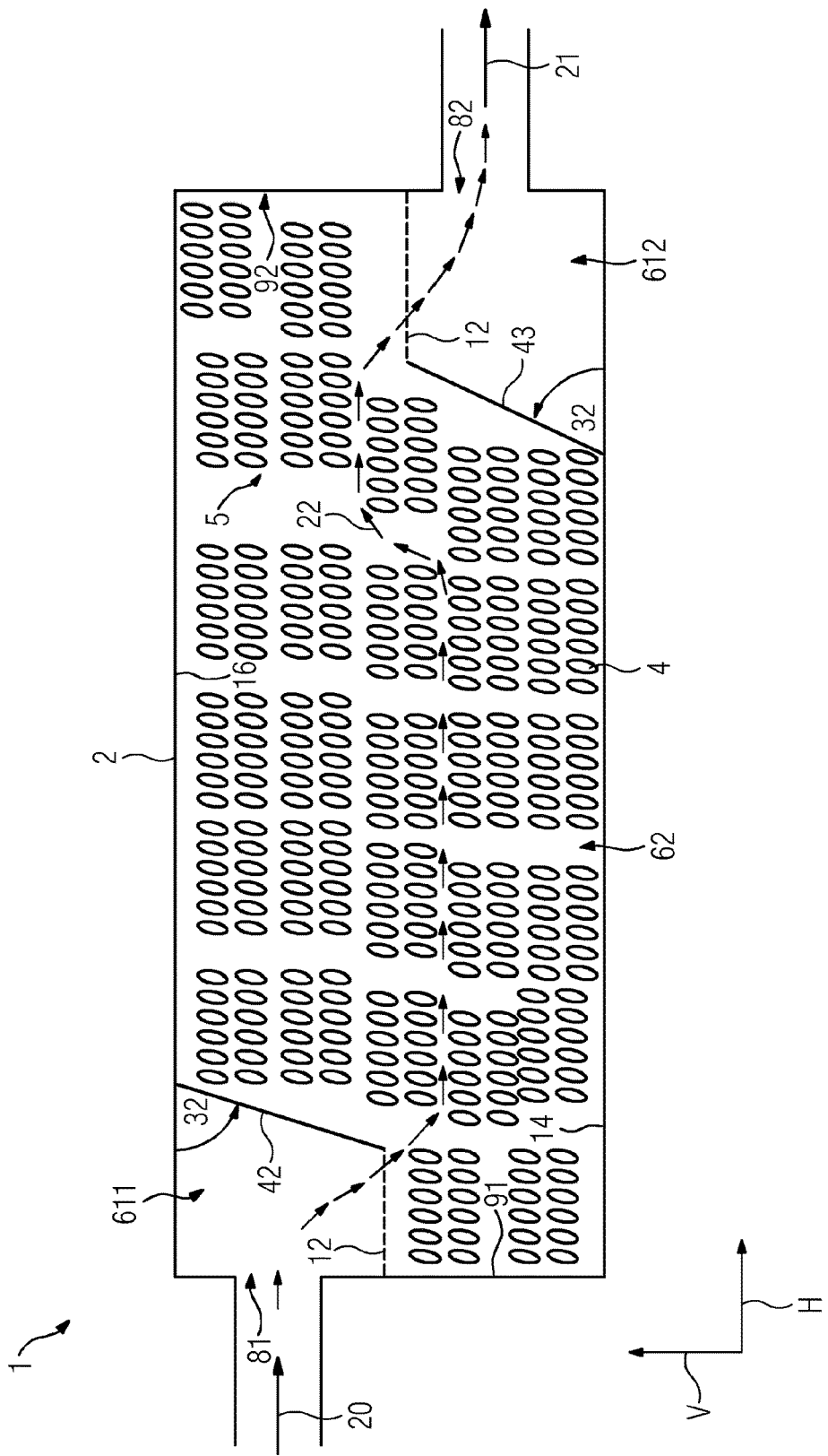

HEAT STORE CONTAINER WITH INCLINED PLATES FOR IMPROVED TEMPERATURE DISTRIBUTION

CROSS-REFERENCE TO RELATED APPLICATIONS

This application is a U.S. National Stage Application of International Application No. PCT/EP2015/058732 filed Apr. 22, 2015, which designates the United States of America, and claims priority to DE Application No. 10 2014 208 453.9 filed May 6, 2014, the contents of which are hereby incorporated by reference in their entirety.

TECHNICAL FIELD

The invention relates to a heat store or heat accumulator for storing thermal energy.

BACKGROUND

Heat stores are thermal energy stores which store thermal energy (heat) and thus temporally decouple the generation of electrical energy from the generation or provision of the thermal energy. The thermal energy stored by means of the heat store can then be guided directly to the consumer as heat or can be used again for generating electrical energy.

One possible heat store is a bulk material store comprising stones or bricks as bulk material. In this case, the bulk material store is typically charged by means of a fluid at a temperature of approximately 600° C.

The prior art distinguishes between vertically and horizontally oriented heat stores. In particular, in the case of a horizontal heat store, temperature gradients, i.e. differences in temperature, can arise in various partial regions of the horizontal heat store during charging or discharging. Said undesired temperature gradients typically arise as a result of natural convection within the horizontal heat store. Said temperature gradients are disadvantageous since they lead to a non-uniform distribution of the heat during charging or discharging of the horizontal heat store. This limits the efficiency of horizontal heat stores.

According to the prior art, an attempt is made to compensate for or to prevent the temperature gradients by means of horizontal and/or vertical plates arranged within the horizontal heat store, such that an approximately uniform distribution of the temperature is established within the horizontal heat store, in particular during charging and discharging. The natural convection is hindered by means of the horizontal or vertical plates arranged in the horizontal heat store, and this consequently leads to homogenization of the temperature distribution within the horizontal heat store. A high number of plates is typically required for this purpose, however. In the case of vertically arranged plates, the pressure losses are additionally increased when charging or discharging the horizontal heat store.

A further disadvantage of known horizontal heat stores is that, in spite of the horizontally or vertically arranged plates, temperature gradients which form, for example, in phases of rest still cannot be prevented. This is therefore the case since a hot fluid, with which the horizontal heat store is charged, is arranged on the cover of the horizontal heat store, whereas the cooler or cooled fluid collects at the base of the horizontal heat store. This results in temperature gradients which lead to mechanical stresses within the heat store material, and therefore the horizontal heat store can be filled only inadequately and consequently the efficiency of the horizontal heat store is reduced.

SUMMARY

One embodiment provides a heat store for storing thermal energy, comprising a container with a horizontally extending longitudinal axis, wherein the container comprises a heat store material, wherein, for the inflow and/or outflow of a fluid, provision is made of a first opening and a second opening offset vertically with respect to the first opening, wherein the container comprises at least one fluid-impermeable plate inclined with respect to an inflow and/or outflow direction of the fluid.

In one embodiment, the plate is at a non-zero acute angle with respect to the inflow and/or outflow direction.

In one embodiment, the plate is arranged on an inner side of the container.

In one embodiment, the container has at least one fluid-permeable distributor plate, wherein the fluid-permeable distributor plate, in conjunction with the fluid-impermeable plate, materially delimits, with respect to the heat store material, at least a first partial region of the container from a second partial region, which second partial region comprises the heat store material.

In one embodiment, the distributor plate comprises a heat-resistant steel.

In one embodiment, the distributor plate comprises a nonwoven material.

In one embodiment, the distributor plate comprises a wire grid.

In one embodiment, the heat store material is formed from a plurality of stone-like elements.

In one embodiment, the heat store material comprises stones, bricks and/or a ceramic material.

In one embodiment, a vertical extent of the heat store perpendicular to the longitudinal axis is at most 10 m.

In one embodiment, a first side of the container has the first opening and a second side of the container lying opposite the first side has the second opening.

Another embodiment provides a method for operating a heat store as disclosed above, in which a fluid is made to flow into a container of the heat store by means of a first opening or a second opening offset vertically with respect to the first opening and is brought into thermal contact with a heat store material, wherein the heat store is charged by making the fluid flow in through the first opening and flow out through the second opening and/or the heat store is discharged by making the fluid flow in through the second opening and flow out through the first opening.

BRIEF DESCRIPTION OF THE DRAWINGS

Example aspects and embodiments of the invention are described below with reference to the sole drawing, FIG. 1, which shows an example heat store comprising two inclined plates.

DETAILED DESCRIPTION

Embodiments of the present invention provide improved temperature distribution of a horizontal heat store.

Some embodiments provide a heat store for storing thermal energy which comprises a container with a horizontally extending longitudinal axis, wherein the container comprises a heat store material. A horizontally oriented, or a horizontal, heat store is formed by the horizontally extending longitudinal axis. For the inflow and/or outflow of a fluid, a first opening and a second opening offset vertically with respect to the first opening are provided, wherein the container comprises at least one fluid-impermeable plate inclined with respect to an inflow and/or outflow direction of the fluid.

In other words, a fluid which flows into or out of the container of the heat store through the first or second opening is deflected by means of the plate which is inclined with respect to the inflow and/or outflow direction. The flow direction of the fluid is consequently changed with respect to the inflow and/or outflow direction by means of the inclined plate. For this purpose, provision is made to arrange the inclined plate in the vicinity of the first or second opening. The inclined plate is arranged in the vicinity of the first/second opening if the spacing of the inclined plate to the first/second opening is smaller than the spacing to the second/first opening.

The inclined plate may be at a non-zero acute angle with respect to the inflow and/or outflow direction of the fluid, such that a change in angle of the flow direction is always effected. In particular, the acute angle differs from 0° and 90°, such that the inclined plate does not extend vertically and does not extend horizontally.

A distribution of the fluid within the heat store or the container may be improved by the inclined plate and the resultant change in the flow direction of the inflowing or outflowing fluid. As a result, temperature gradients in the container and consequently within the heat store are reduced. It is preferable that the fluid-impermeable inclined plate is arranged in the vicinity of the first opening and a further fluid-impermeable inclined plate is arranged in the vicinity of the second opening. Consequently, the container preferably comprises at least two fluid-impermeable inclined plates.

During charging of the heat store, the fluid-impermeable plate is inclined in the vicinity of the first opening in such a manner that the inflowing hot fluid undergoes a change in the flow direction which diverts the hot fluid to the base of the heat store. This advantageously prevents natural convection of the fluid to the cover of the heat store when the fluid is flowing in.

In the case of discharging of the heat store, the inflowing cold fluid is conducted into an upper region, i.e. to the cover of the heat store, by means of the further inclined plate in the vicinity of the second opening. As a whole, this compensates for temperature gradients which could arise between the cover and the base of the heat store.

Temperature gradients within the heat store are reduced further by the vertical offset of the first and second openings. The vertical spacing between the first opening and the cover of the container is preferably smaller than the vertical spacing between the second opening and the cover of the container. Furthermore, provision is made of a smaller vertical spacing between the second opening and the base of the container compared to a vertical spacing between the first opening and the base of the container. In other words, the first opening is arranged in the vicinity of the cover of the container and the second opening is arranged in the vicinity of the base of the container. As a result, the first and the second opening have the mutual vertical offset. The temperature of a fluid flowing in or flowing out through the first opening is expediently higher than the temperature of a fluid flowing in or flowing out through the second opening. In the disclosed method for operating a heat store according to the invention, a fluid is made to flow into a container of the heat store by means of a first opening or a second opening offset vertically with respect to the first opening and is brought into thermal contact with a heat store material, wherein the heat store is charged by making the fluid flow in through the first opening and flow out through the second opening and/or the heat store is discharged by making the fluid flow in through the second opening and flow out through the first opening.

In this respect, the first opening is arranged in the vicinity of the cover of the container and the second opening is arranged in the vicinity of the base of the container. During charging of the heat store, the fluid flowing in through the first opening is thereby advantageously conducted by means of the inclined plate to the base of the container. During charging, the fluid flowing into the container by means of the first opening flows out of the container by means of the second opening, with the fluid being conducted to the cover of the container before it flows out, preferably by means of the further inclined plate arranged in the container. This gives rise to a flow progression of the fluid within the container which is similar to a horizontally oriented S shape. This produces an approximately uniform temperature distribution within the container.

By virtue of the thermal contact between the fluid and the heat store material of the heat store, the heat is transferred from the fluid to the heat store material during charging of the heat store. During discharging, the heat stored in the heat store, or in the heat store material, is transferred by the thermal contact from the heat store material to the fluid. In particular, during charging of the heat store, the hot fluid flowing in through the first opening is at a higher temperature than the heat store material. During discharging of the heat store, the temperature of the fluid is lower than the temperature of the heat store material. A temperature of the fluid of approximately 873.15 K (600° C.) is provided when the fluid is flowing in and a temperature of the fluid of approximately 453.15 K (180° C.) is provided when the fluid is flowing out.

Advantages of the disclosed method may be similar and equivalent to those of the disclosed heat store.

According to one embodiment, the inclined plate is arranged on an inner side of the container, in particular on the base or on the cover.

This advantageously further improves the change in angle of the flow direction of the inflowing or outflowing fluid by means of the inclined plate, since throughflow of the fluid on the inner side of the container, in particular on the cover or on the base of the container, is prevented.

Particular preference is given to a heat store, the container of which has at least one fluid-permeable distributor plate, wherein the fluid-permeable distributor plate, in conjunction with the fluid-impermeable plate, materially delimits, with respect to the heat store material, at least a first partial region of the container from a second partial region, which second partial region comprises the heat store material.

This advantageously forms a first partial region, in which the fluid is firstly deflected by means of the inclined plate and distributed in the heat store material by means of the fluid-permeable distributor plate. In this case, the fluid is transferred from the first partial region into the second partial region comprising the heat store material via the fluid-permeable distributor plate. In other words, the inflow and/or outflow of the fluid in the first partial region is not disrupted by the heat store material. Preference is given in this respect to a distributor plate which comprises a heat-resistant steel. This expediently ensures that the distributor plate satisfies necessary thermal and mechanical requirements which arise through the arrangement of the distributor plate within the container. In particular, a load-bearing function, for example the support of stones arranged in the container, is provided for a distributor plate made of a heat-resistant steel.

A distributor plate which comprises a nonwoven is particularly advantageous.

This advantageously further improves the approximately uniform distribution of the fluid within the container. A further advantage of the nonwoven is that the nonwoven adapts to the shape and form of the heat store material and consequently can follow deformation of the heat store material, for example as a result of thermal loading.

Preference may be given to a distributor plate which comprises a wire grid.

In this respect, the wire grid preferably consists of wires which are formed from a heat-resistant steel.

According to one embodiment, the heat store material is formed from a plurality of stone-like elements.

In this respect, particular preference is given to a heat store material which comprises stones, bricks and/or a ceramic material.

This is therefore advantageous since stones, bricks and/or ceramic materials have a particularly high heat capacity, and therefore a particularly efficient heat store is formed using the aforementioned heat store materials.

Preference is given to a heat store having a vertical extent perpendicular to the longitudinal axis thereof of at most 10 m.

In other words, the heat store forms a horizontal heat store. Compared to a vertical heat store, a horizontal heat store has the advantage that the geometrical extent along the longitudinal axis, which in the case of the vertical store corresponds to the height of the store, essentially is not subjected to any limitation. In addition, horizontal heat stores are technically less complex than vertical heat stores. In this context, the longitudinal axis denotes that axis of the heat store which corresponds to the direction of its greatest geometrical extent.

According to one embodiment, a first side of the container has the first opening and a second side of the container lying opposite the first side has the second opening.

Advantageously, the fluid thereby flows through approximately the entire heat store. This improves the efficiency of the heat store.

FIG. 1 shows a heat store 1, which comprises a container 2 with two inclined plates 42, 43. In this case, the container 2 extends along a longitudinal axis, the longitudinal axis running substantially parallel to a horizontal direction H.

The terms "horizontal" and "vertical" always refer to a gravitational force prevailing at the site of the heat store 1 (vertical direction).

On a first side 91, the container 2 has a first opening 81. In this respect, the first opening 81 is arranged in an upper region of the container 2 in the vicinity of the cover 16. As a result, the vertical spacing between the first opening 81 and the cover 16 is smaller than the vertical spacing between the first opening 81 and a base 14 of the container 2. The terms "upper" and "lower" refer to a vertical direction V (vertical direction), the upper end (cover 16) of the container 2 following after a lower end (base 14) of the container 2 in a vertical direction V.

A second side 92 of the container 2 lying opposite the first side 91 has a second opening 82, the second opening 82 being located in the lower region of the container 2 in the vicinity of the base 14. The vertical spacing between the second opening 82 and the base 14 is consequently smaller than the vertical spacing between the second opening 82 and the cover 16 of the container 2. In other words, the second opening 82 is vertically offset with respect to the first opening 81.

The inclined plate 42 is arranged on the cover 16 and the further inclined plate 43 is arranged on the base 14, with each of the inclined plates 42, 43 defining or forming a non-zero acute angle 32 together with the cover 16 or the base 14. In this respect, the plates 42, 43 extend in an approximately parallel manner.

Furthermore, the container 2 comprises two distributor plates 12, which extend approximately parallel to the horizontal direction H and, within the container 2, delimit in each case with the first or second side 91, 92 and in each case with one of the inclined plates 42, 43 a first partial region 611 and a further first partial region 612 of the container 2. A heat store material 5 of the heat store 1 is arranged in a second partial region 62 of the container 2. In this respect, the heat store material 5 comprises stones 4. No heat store material 5 is arranged within the first partial regions 611, 612. The two first partial regions 611, 612 are connected in a fluidically open manner to the first or second opening 81, 82 and consequently form an inlet and/or outlet region 611, 612 for a fluid flowing through the heat store 1.

For charging the heat store 1, a hot fluid having an inflow direction 20 is made to flow into the container 2. By way of example, air is used here as the fluid. By means of the inclined plate 42, which is arranged in the vicinity of the first opening 81, the flow direction 22 of the fluid is changed with respect to the inflow direction 20, such that the inflowing fluid is diverted downward to the base 14 of the container 2. In the process, the fluid passes via the distributor plate 12 into the second partial region 62 of the container 2 and is in thermal contact with the heat store material 5. After it has flowed through the second partial region 62 of the container 2, the flow direction 22 of the fluid is changed by the further inclined plate 43, which is arranged in the vicinity of the second opening 82, such that the fluid is diverted upward to the cover 16 of the container 2. Then, the fluid flows via a further distributor plate 12 into the further first partial region 612 of the container 2 and flows out of the container 2 from the second opening 82 along an outflow direction 21.

Advantageously, the hot fluid flowing in through the first opening 81 is conducted downward to the base 16 of the container 2 by means of the plate 42, that is to say to the cold temperature prevailing in the heat store 1 or in the container 2, such that the heat store material 5 arranged in the lower region is heated by the hot fluid which has flowed in or been conducted in. As a result of the heating of the heat store material 5, the fluid cools and flows out of the container 2 through the second opening 82 along the outflow direction 21. In this case, before it flows out, the fluid is conducted by means of the further inclined plate 43 to the cover 2 of the container. The flow of the fluid through the heat store material 5 arranged in the container 2 is thereby advantageously improved by the inclined plates 42, 43. As a result, temperature gradients within the container 2 or within the heat store material 5 are reduced or avoided.

During discharging of the heat store 1, the second opening 82 serves as an inlet and the first opening 20 serves as an outlet for the fluid, such that the flow direction during discharging of the heat store 1 is reversed with respect to the flow direction 22 during charging of the heat store 1. However, the advantage according to the invention of the improved distribution of the fluid within the container 2 and the resultant improved temperature distribution is also retained during discharging.

The flow direction 22 of the fluid may consequently be continuously changed and adapted by means of the inclined plates 42, 43 in such a way that the hot fluid is made to flow or conducted into a cold partial region of the container 2 or the cold fluid is made to flow or conducted into a hot partial region of the container 2. The flow direction 22 of the fluid is thereby advantageously adapted to the temperature distribution within the heat store 1.

Although the invention has been described and illustrated in more detail by the preferred exemplary embodiments, the invention is not limited by the disclosed examples, or other variations can be derived therefrom by a person skilled in the art without departing from the scope of protection of the invention.

What is claimed is:

1. A heat store for storing thermal energy, the heat store comprising:
    a container with a horizontally extending longitudinal axis, the container including: a base; a cover; a heat store material; and a first opening adjacent the cover in a first sidewall and a second opening adjacent the base in a second sidewall configured for at least one of inflow or outflow of a fluid parallel to the cover and the base along the longitudinal axis, the second opening being offset vertically with respect to the first opening;
    first and second impermeable plates that (a) are inclined with respect to an inflow or outflow direction of the fluid, (b) are arranged on an inner side of the container, and (c) extend in parallel;
    wherein the first impermeable plate is arranged on the cover and the second impermeable plate is arranged on the base;
    wherein the first impermeable plate forms a non-zero acute angle with the cover and the second impermeable plate forms the non-zero acute angle with the base; and
    wherein the first impermeable plate is configured to conduct a hot fluid, received via the first opening and striking a first face of the first impermeable plate, downward to the base, and the second impermeable plate is configured to conduct the hot fluid to the cover of the container; and
    a fluid-permeable distributor plate defining a first region of the container segregating heat store material outside the first region, wherein an inflow of fluid into the first region strikes the first face of the first impermeable plate before passing through the fluid-permeable plate and coming into contact with any heat store material and does not come into contact with the first face of the first impermeable plate after leaving the first region.

2. The heat store of claim 1, wherein the at least one fluid-permeable distributor plate comprises a heat-resistant steel.

3. The heat store of claim 1, wherein the at least one fluid-permeable distributor plate comprises a nonwoven material.

4. The heat store of claim 1, wherein the at least one fluid-permeable distributor plate comprises a wire grid.

5. The heat store of claim 1, wherein the heat store material comprises at least one of stones, bricks, or a ceramic material.

6. The heat store of claim 1, wherein a vertical extent of the heat store perpendicular to the longitudinal axis is at most 10 meters.

7. The heat store of claim 1, wherein the first sidewall of the container is opposite the second sidewall of the container.

8. A method, comprising:
    providing a heat store for storing thermal energy including a container with a base, a cover, a heat store material, a first opening adjacent the cover in a first sidewall and a second opening adjacent the base in a second sidewall configured for at least one of inflow or outflow of a fluid parallel to the cover and the base, the second opening being offset vertically with respect to the first opening, first and second impermeable plates that (a) are inclined with respect to an inflow or outflow direction of the fluid, (b) are arranged on an inner side of the container, and (c) extend in parallel, the first plate being arranged on the cover and the second plate being arranged on the base, the first plate forming a non-zero acute angle with the cover and the second plate forming the non-zero acute angle with the base;
    causing the fluid to flow into a container of the heat store via the first opening or the second opening offset vertically with respect to the first opening, and bringing the fluid into thermal contact with the heat store material;
    wherein a fluid-permeable distributor plate defines a first region of the container segregating heat store material outside the first region and an inflow of fluid into the first region strikes a first face of the first impermeable plate before passing through the fluid-permeable plate and coming into contact with any heat store material and does not come into contact with the first face of the first impermeable plate after leaving the first region; and
    at least one of:
        charging the heat store by directing a hot fluid in through the first opening, downward to the base via the first plate, and out through the second opening; or
        discharging the heat store by directing the hot fluid in through the second opening, to the cover of the container via the second plate, and out through the first opening.

* * * * *